(12) United States Patent
Clark et al.

(10) Patent No.: US 9,988,906 B2
(45) Date of Patent: Jun. 5, 2018

(54) TURBOMACHINE ROTOR BLADE MILLING MACHINE SYSTEM AND METHOD OF FIELD REPAIRING A TURBOMACHINE ROTOR BLADE

(71) Applicant: General Electric Company, Schenectady, NY (US)

(72) Inventors: Jason Matthew Clark, Loveland, OH (US); John William Herbold, Fountain Inn, SC (US); James Bradford Holmes, Fountain Inn, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 109 days.

(21) Appl. No.: 14/965,938

(22) Filed: Dec. 11, 2015

(65) Prior Publication Data

US 2016/0097282 A1    Apr. 7, 2016

Related U.S. Application Data

(62) Division of application No. 13/762,507, filed on Feb. 8, 2013, now abandoned.

(51) Int. Cl.
*B23C 3/30*        (2006.01)
*F01D 5/00*       (2006.01)
(Continued)

(52) U.S. Cl.
CPC ............... *F01D 5/005* (2013.01); *B23C 3/30* (2013.01); *B23C 9/00* (2013.01); *B23P 6/002* (2013.01);
(Continued)

(58) Field of Classification Search
CPC .......... F01D 5/005; F01D 5/02; F01D 25/285; B23C 3/30; B23C 1/20; B23C 3/28;
(Continued)

(56) References Cited

U.S. PATENT DOCUMENTS 3,243,178 A    3/1966  Williamson et al.
3,800,840 A    4/1974  McCord, Jr.
(Continued)

FOREIGN PATENT DOCUMENTS

DE            885001 C1    8/1953
DE    102008000480 A1    9/2009
(Continued)

OTHER PUBLICATIONS

European Search Report for EP 14153552.6 dated May 11, 2016, 7 pages.

*Primary Examiner* — Alan Snyder
(74) *Attorney, Agent, or Firm* — Dority & Manning, PA

(57) ABSTRACT

A turbomachine rotor blade milling machine system includes a fixture having a body including first and second opposing surfaces and a slot. The fixture is configured and disposed to connect with first and second rotor blade sections mounted in a rotor wheel. A mounting system includes at least one mounting element coupled to one of the first and second opposing surfaces of the body at the slot. A milling machine is coupled to the one of the first and second opposing surfaces through the at least one mounting element. The milling machine includes a cutter and is configured and disposed to form an opening extending axially through a dovetail portion of a third rotor blade section arranged between the first and second rotor blade sections.

11 Claims, 8 Drawing Sheets

(51) Int. Cl.
  *B23P 6/00* (2006.01)
  *B23C 9/00* (2006.01)
  *F01D 5/02* (2006.01)
  *F01D 5/12* (2006.01)
  *F04D 29/32* (2006.01)
  *F01D 25/28* (2006.01)

(52) U.S. Cl.
  CPC ............... *F01D 5/02* (2013.01); *F01D 5/12* (2013.01); *F04D 29/324* (2013.01); *B23C 2215/52* (2013.01); *B23C 2220/366* (2013.01); *F01D 25/285* (2013.01); *F05D 2220/30* (2013.01); *F05D 2230/10* (2013.01); *F05D 2230/80* (2013.01); *F05D 2240/30* (2013.01); *Y10T 29/37* (2015.01); *Y10T 29/49318* (2015.01)

(58) Field of Classification Search
  CPC .......... B23C 2215/04; B23C 2215/045; B23C 2215/44; B23P 6/002; F05D 2230/10; Y10T 29/4932; Y10T 29/49318; Y10T 409/306328; Y10T 409/306384; Y10T 409/306216; B23Q 9/0007; B23Q 9/0014; B23Q 9/028; B23Q 9/02; B25H 1/0021; B25H 1/0042
  See application file for complete search history.

(56) References Cited

U.S. PATENT DOCUMENTS

| | | |
|---|---|---|
| 3,834,435 A | 9/1974 | McCord, Jr. |
| 3,878,875 A | 4/1975 | McCord, Jr. |
| 4,168,730 A | 9/1979 | Keller |
| 4,422,356 A | 12/1983 | Pertle |
| 4,428,408 A | 1/1984 | Grisley |
| 4,505,075 A | 3/1985 | Salmon et al. |
| 4,603,717 A | 8/1986 | Thomas |
| 4,650,256 A | 3/1987 | Wetzinger |
| 4,805,282 A | 2/1989 | Reaves et al. |
| 5,027,500 A | 7/1991 | Keck et al. |
| 5,032,051 A | 7/1991 | Gilmore |
| 5,048,177 A | 9/1991 | Keck et al. |
| 5,075,959 A | 12/1991 | Keck et al. |
| 5,101,557 A | 4/1992 | Mueller et al. |
| 5,161,291 A | 11/1992 | Guenther |
| 5,284,406 A | 2/1994 | Mueller et al. |
| 5,869,194 A | 2/1999 | Dwyer |
| 6,039,038 A | 3/2000 | Buck et al. |
| 6,049,979 A | 4/2000 | Nolan et al. |
| 6,139,412 A | 10/2000 | Dwyer |
| 6,375,423 B1 | 4/2002 | Roberts et al. |
| 6,509,539 B2 | 1/2003 | Fischer et al. |
| 6,560,890 B1 | 5/2003 | Madge et al. |
| 6,745,622 B2 | 6/2004 | Smith et al. |
| 6,802,134 B2 | 10/2004 | Allen |
| 6,820,468 B2 | 11/2004 | Powers et al. |
| 7,178,255 B1 | 2/2007 | Roesel et al. |
| 7,190,162 B2 | 3/2007 | Tenley et al. |
| 7,328,496 B2 | 2/2008 | Powers et al. |
| 7,337,520 B2 | 3/2008 | Jones et al. |
| 7,344,359 B2 | 3/2008 | Deallenbach |
| 7,448,844 B1 | 11/2008 | Johnson |
| 7,579,830 B2 | 8/2009 | Roney et al. |
| 7,762,004 B2 | 7/2010 | Sherlock et al. |
| 7,762,534 B2 | 7/2010 | Ouellette et al. |
| 7,934,302 B2 | 5/2011 | Kalmar et al. |
| 8,056,227 B2 | 11/2011 | DeMania et al. |
| 8,122,600 B2 | 2/2012 | Kinstler et al. |
| 8,225,447 B2 | 7/2012 | Calkins, Jr. et al. |
| 2002/0168241 A1 | 11/2002 | David et al. |
| 2005/0198821 A1 | 9/2005 | Reville et al. |
| 2009/0077795 A1 | 3/2009 | Prince et al. |
| 2010/0313909 A1 | 12/2010 | Calkins, Jr. et al. |
| 2013/0051947 A1* | 2/2013 | Holmes ............. B23B 41/00 408/103 |

FOREIGN PATENT DOCUMENTS

| | | |
|---|---|---|
| EP | 0154813 A1 | 9/1985 |
| EP | 0223030 A1 | 5/1987 |
| EP | 0486131 | 5/1992 |
| EP | 2282012 A1 | 2/2011 |
| EP | 2514924 | 10/2012 |
| JP | 4189461 A | 7/1992 |
| JP | 5295979 | 11/1993 |
| JP | 6126566 A | 5/1994 |
| JP | 6190668 A | 7/1994 |
| JP | 2010078105 A | 4/2010 |

\* cited by examiner

TURBOMACHINE ROTOR BLADE MILLING MACHINE SYSTEM AND METHOD OF FIELD REPAIRING A TURBOMACHINE ROTOR BLADE

RELATED APPLICATIONS

The present application is based on and claims priority to U.S. Non-Provisional patent application Ser. No. 13/762,507, filed on Feb. 8, 2013, which is incorporated herein by reference.

BACKGROUND OF THE INVENTION

The subject matter disclosed herein relates to the art of turbomachines and, more particularly, to a turbomachine rotor blade milling machine system and method.

Gas turbomachines include a compressor portion linked to a turbine portion through a common compressor/turbine shaft and a combustor assembly. An inlet airflow is passed through an air intake toward the compressor portion. In the compressor portion, the inlet airflow is compressed through a number of sequential stages toward the combustor assembly and the turbine portion. In the combustor assembly, a portion of the compressed airflow mixes with a fuel to form a combustible mixture. The combustible mixture is combusted in the combustor assembly to form hot gases. The hot gases are guided to the turbine portion through a transition piece. The hot gases expand through the turbine portion acting upon turbine blades mounted on wheels to create work that is output, for example, to power a generator, a pump, or to provide power to a vehicle. Over time, components such as compressor blades and turbine blades wear and/or become damaged necessitating repair and/or replacement.

BRIEF DESCRIPTION OF THE INVENTION

According to one aspect of an exemplary embodiment, a turbomachine rotor blade milling machine system includes a fixture having a body including first and second opposing surfaces and a slot. The fixture is configured and disposed to connect with first and second rotor blade sections mounted in a rotor wheel. A mounting system includes at least one mounting element coupled to one of the first and second opposing surfaces of the body at the slot. A milling machine is coupled to the one of the first and second opposing surfaces through the at least one mounting element. The milling machine includes a cutter and is configured and disposed to form an opening extending axially through a dovetail portion of a third rotor blade section arranged between the first and second rotor blade sections.

According to another aspect of the exemplary embodiment, a method of repairing a turbomachine rotor blade includes removing an airfoil portion of a first turbomachine rotor blade, a second turbomachine rotor blade and a third turbomachine rotor blade mounted to a rotor wheel, aligning a slot formed in a fixture with a root portion of the airfoil portion removed from the second turbomachine rotor blades, mounting the fixture to the first turbomachine rotor blade and the third turbomachine rotor blade with the root portion of the second turbomachine rotor blade aligned with the slot, positioning a cutter of a milling machine in the slot, securing the milling machine to the fixture, and guiding the cutter through a dovetail portion of the second turbomachine rotor blade to perform a repair of the turbomachine.

According to yet another aspect of the exemplary embodiment, a turbomachine includes a compressor portion including at least one compressor rotor wheel having a plurality of compressor rotor blades, and a turbine portion including at least one turbine rotor wheel having a plurality of turbine rotor blades. A turbomachine rotor blade milling machine system is mounted to one of the compressor rotor wheel and turbine rotor wheel. The turbomachine rotor blade milling system includes a fixture having a body including first and second opposing surfaces and a slot. The fixture is mounted to the one of the compressor rotor wheel and the turbine rotor wheel. A mounting system includes at least one mounting element coupled to one of the first and second opposing surfaces of the body at the slot. A milling machine is coupled to the one of the first and second surfaces through the mounting system. The milling machine includes a cutter and is configured and disposed to form an opening extending axially through a dovetail portion of a corresponding one of the plurality of compressor rotor blades and the plurality of turbine rotor blades.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
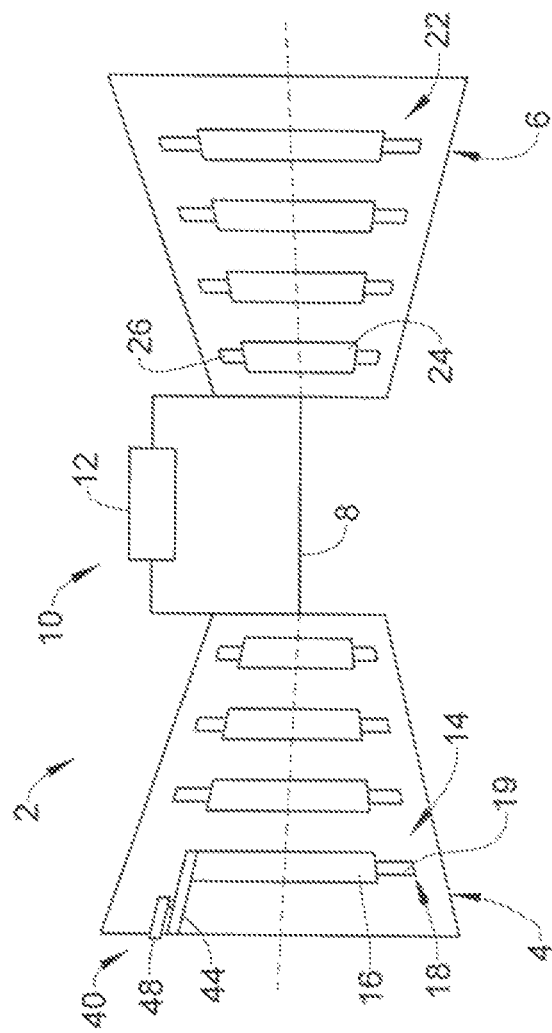
FIG. 1 is a schematic view of a turbomachine including a blade milling system in accordance with an exemplary embodiment.

A turbomachine is indicated generally at 2 in FIG. 1. Turbomachine 2 includes a compressor portion 4 operatively coupled to a turbine portion 6 through a common compressor/turbine shaft 8. Compressor portion 4 is also fluidically connected to turbine portion 6 through a combustor assembly 10. Combustor assembly 10 includes one or more combustors 12. Combustors 12 may be mounted to turbomachine 2 in a wide range of configurations including, but not limited to, being arranged in a can-annular array. Compressor portion 4 includes a plurality of compressor rotor wheels indicated generally at 14. Rotor wheels 14 include a first stage compressor rotor wheel 16 having a plurality of first stage compressor rotor blades 18 each having an associated airfoil portion 19. Similarly, turbine portion 6 includes a plurality of turbine rotor wheels 22 including a first stage turbine wheel 24 having a plurality of first stage turbine rotor blades 26.

In accordance with an exemplary embodiment, turbomachine 2 includes a blade milling system 40 mounted to first stage compressor rotor wheel 16. As will become more evident below, blade milling system 40 is employed to remove frozen compressor rotor blades 18 from first stage compressor rotor wheel 16. More specifically, blade milling system 40 facilitates in field or in situ removal and repair of frozen rotor blades. Blade milling system 40 includes a fixture 44 and a milling machine 48. Fixture 44 serves as an interface between first stage compressor rotor wheel 16 and milling machine 48.

Figure 2:
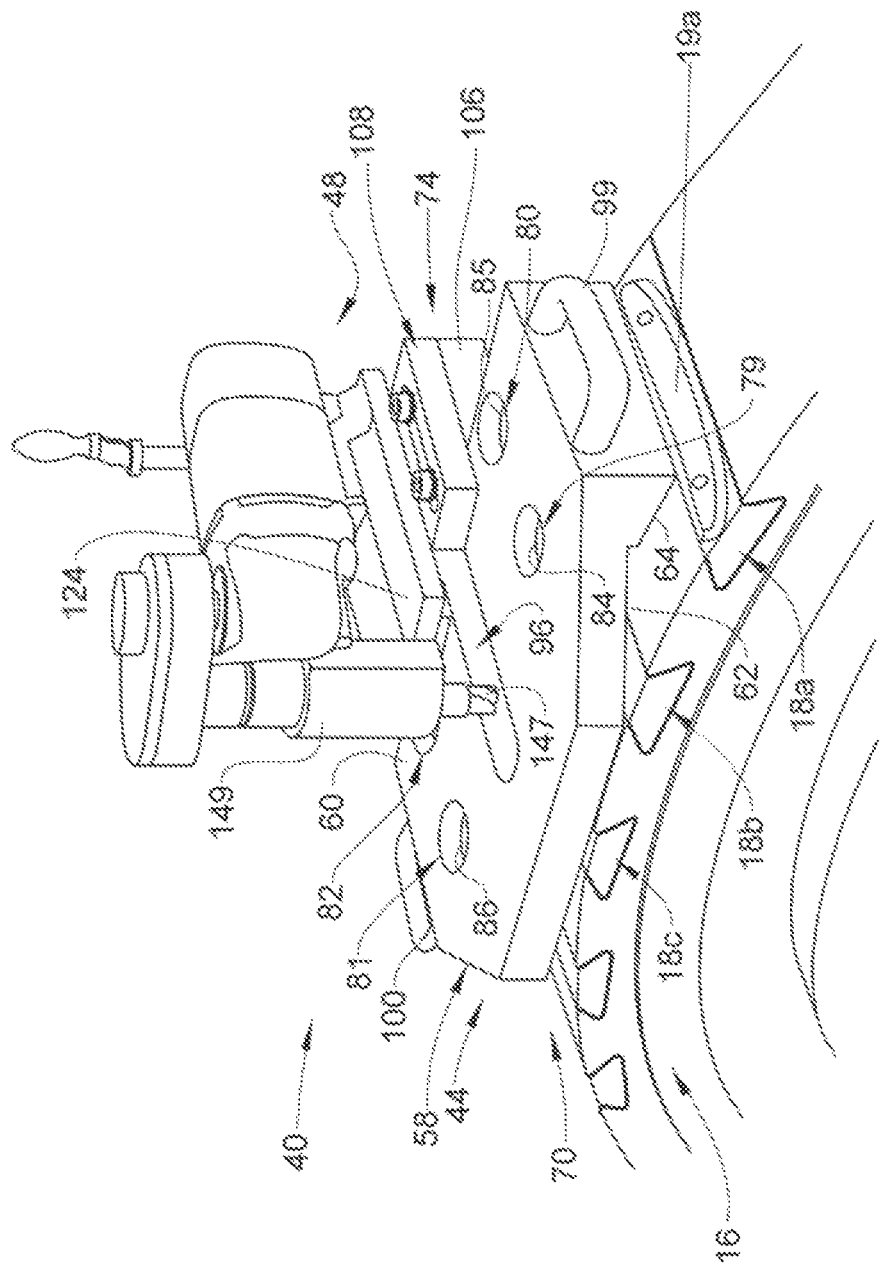
FIG. 2 is a perspective view of the blade milling system of FIG. 1 mounted to a compressor rotor wheel.
Figure 3:
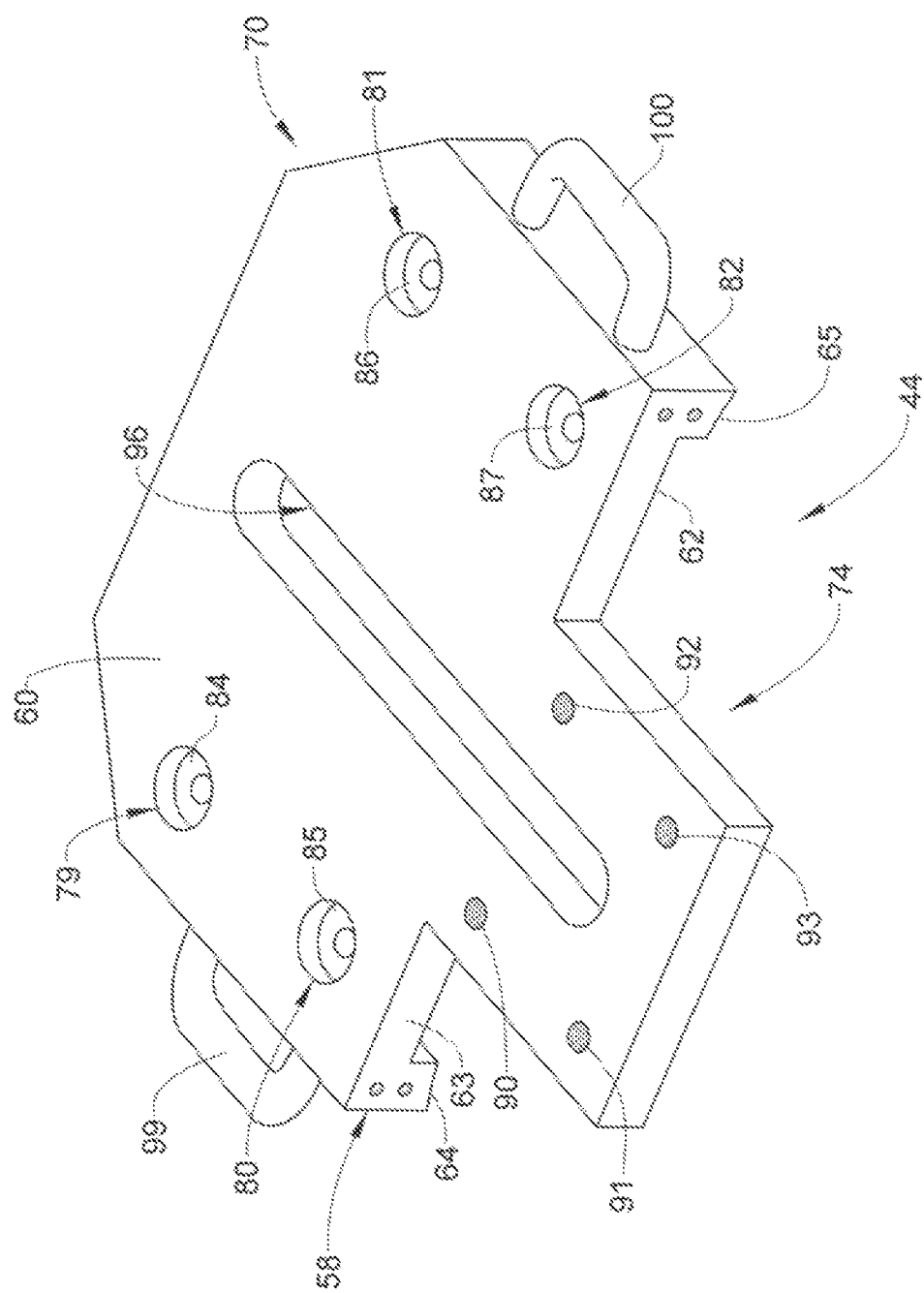
FIG. 3 is a perspective view of a fixture portion of the blade milling system of FIG. 2.
Figure 4:
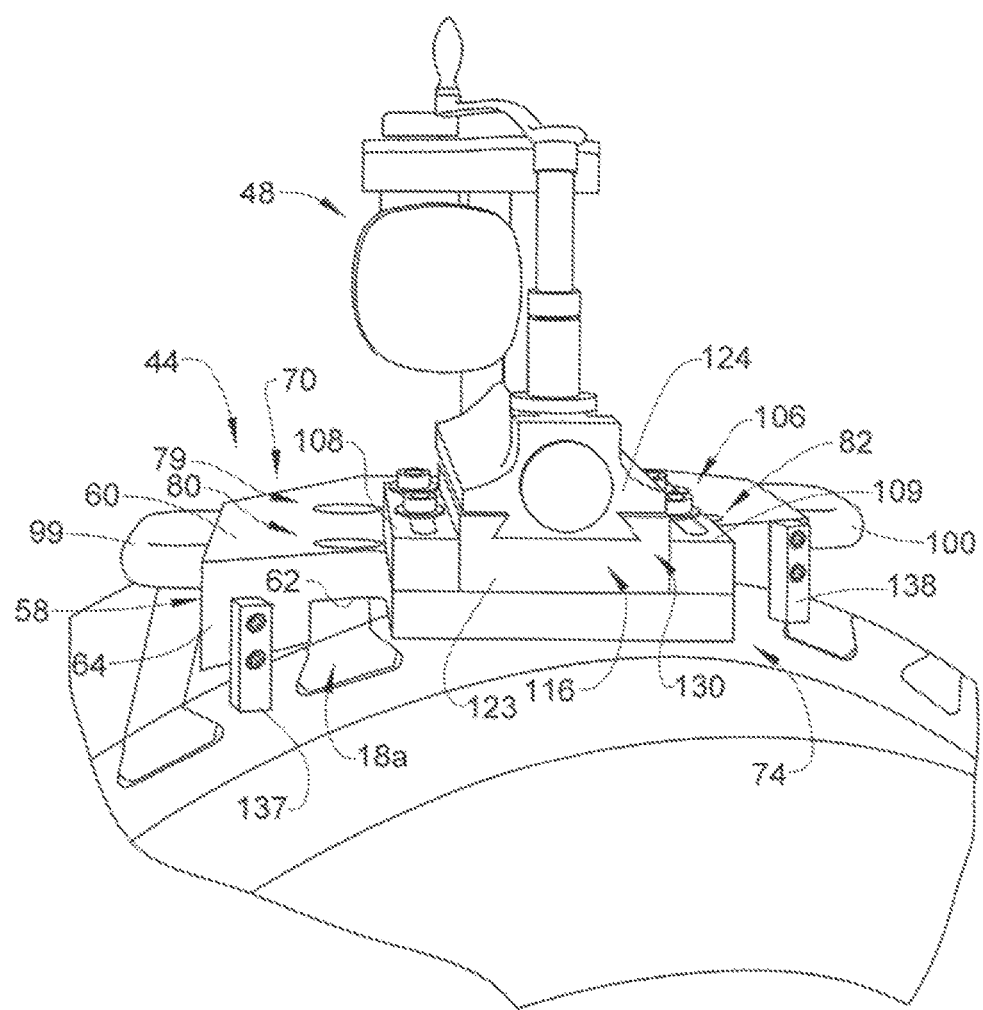
FIG. 4 is an axial end view of the blade milling system of FIG. 2.
Figure 5:
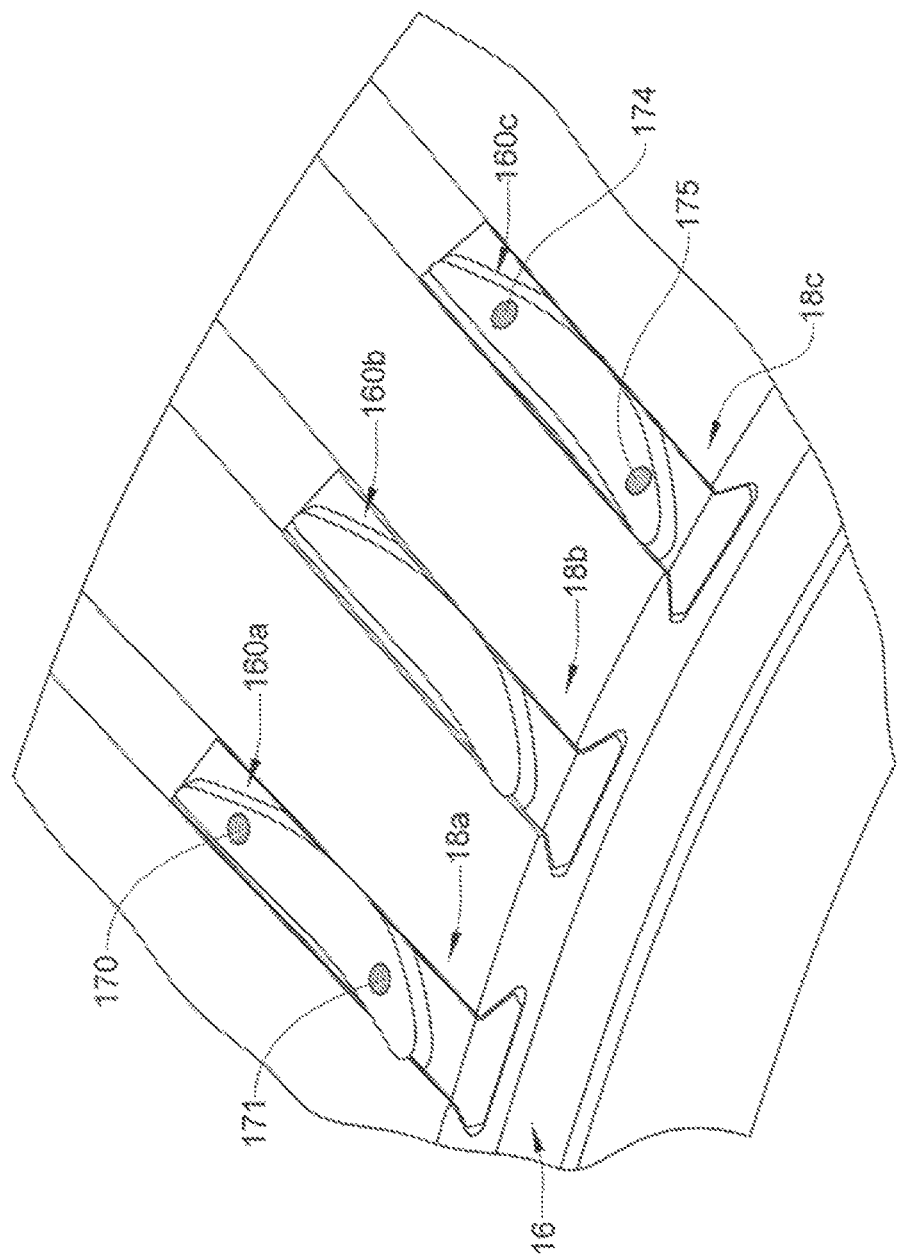
FIG. 5 is a detail view of the compressor rotor wheel after removal of rotor blade airfoil portions.

As best seen in FIGS. 2-4, fixture 44 includes a body 58 having a first surface 60 and an opposing, second surface 62 separated by a peripheral edge 63. First surface 60 is substantially planar while second surface 62 includes first and second radiused portions 64 and 65 that conform to an outer circumferential profile (not separately labeled) of first stage compressor rotor wheel 16. Fixture 44 includes a mounting section 70 and a guide section 74.

Mounting section 70 includes a plurality of mounting members 79-82 that take the form of recessed openings 84-87 respectively. Recessed openings 84 and 85 are spaced from recessed openings 86 and 87 by a rotor blade width. More specifically, recessed openings 84 and 85 are arranged to align with one rotor blade and recessed openings 86 and 87 are arranged to align with another rotor blade with a third rotor blade being centrally located therebetween as will be detailed more fully below. Guide section 74 extends substantially perpendicularly from mounting section 70 and includes a plurality of threaded openings 90-93. A slot 96 extends through guide section 74 to mounting section 70. Slot 96 is centrally located on fixture 44. Fixture 44 is also shown to include first and second handles 99 and 100 projecting from outer peripheral edge 63 on opposing sides (not separately labeled) of mounting section 70.

In further accordance with an exemplary embodiment, fixture 44 includes a mounting system 106 provided on guide section 74. Mounting system 106 includes first and second mounting elements 108 and 109. First mounting element 108 is secured to guide section 74 through mechanical fasteners (not separately labeled) that engage with threaded openings 90 and 91. Second mounting element 109 is secured to guide section 74 through mechanical fasteners (not separately labeled) that engage with threaded openings 92 and 93. Each mounting element 108 and 109 includes elongated openings or slots (also not separately labeled). Slots provide adjustability for mounting elements 108 and 109 on guide section 74. Mounting system 106 secures a milling machine guide member 116 to guide section 74.

Milling machine guide member 116 includes a first guide element 123 and a second guide element 124. First guide element 123 is coupled to guide section 74. First guide element 123 is also coupled to second guide element 124 through a dovetail interface 130. Dovetail interface 130 allows for a sliding, axial shifting of second guide element 124 relative to first guide element 123. Fixture 44 is also shown to include first and second axial alignment members 137 and 138. Axial alignment members 137 and 138 establish a desired axial alignment of fixture 44 relative to first stage compressor rotor wheel 16. As will be detailed more fully below, fixture 44 supports and aligns milling machine 48 to create an opening in rotor blade 18. More specifically, milling machine 48 is mounted to second guide element 124. Once in position, a cutter 147, mounted to a cutting head 149 of milling machine 48, extends through slot 96. Second guide element 124 is shifted axially over guide section 74 to move cutter 147 through rotor blade 18.

Figure 6:
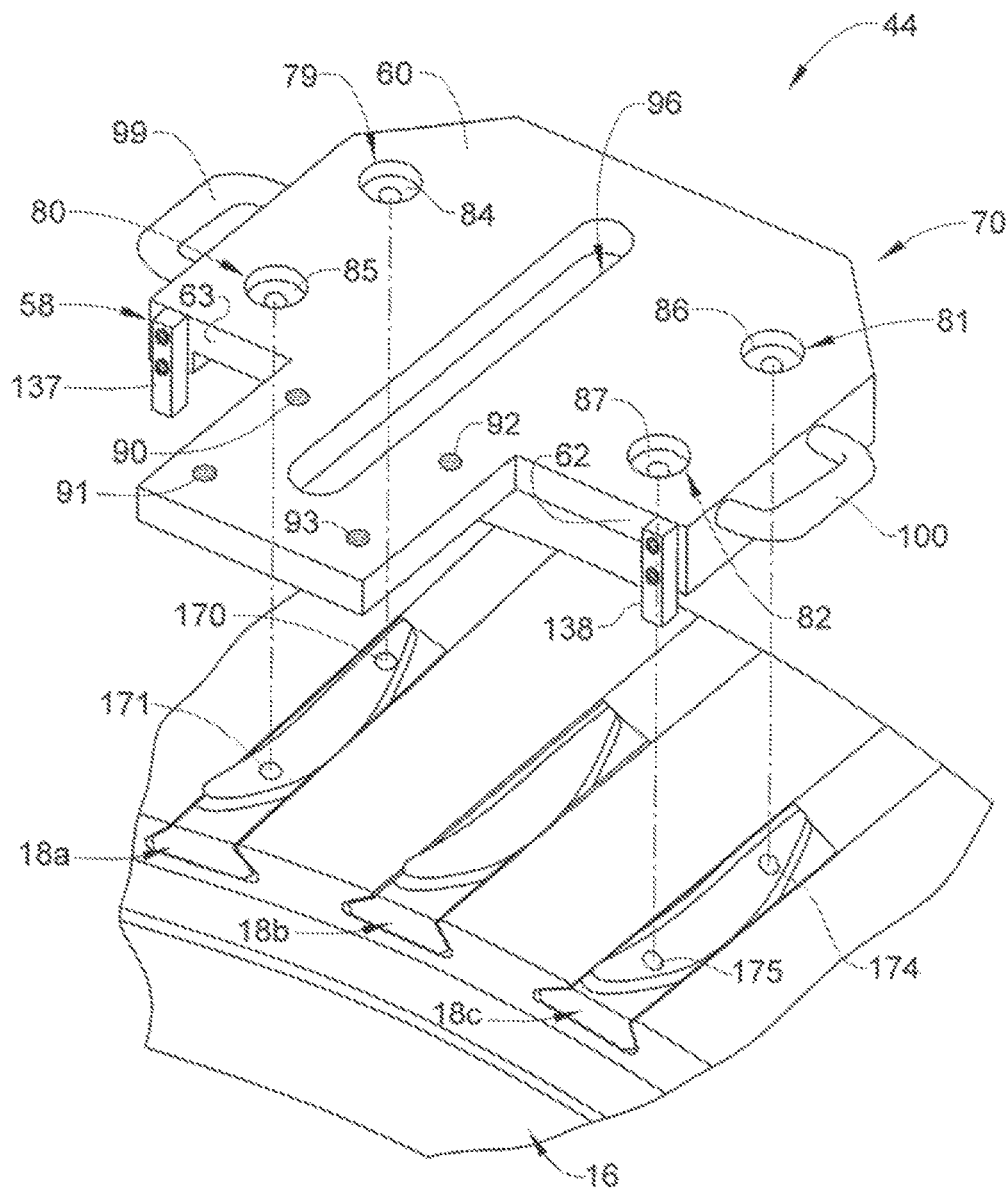
FIG. 6 is a detail view of the fixture of FIG. 3 mounted to the rotor wheel of FIG. 5.

Reference will now follow to FIGS. 5-8 in describing a method of field repairing first stage compressor rotor wheel 16. Initially, first stage compressor rotor blades 18a, 18b and 18c are cut off at root sections 160a, 160b and 160c. More specifically, airfoil portions 19a, 19b, and 19c are removed from each first stage compressor blade 18 forming root portions 160a, 160b, and 160c respectively. It should be understood that generally, prior to mounting fixture 44, all airfoil portions 19 are removed. Once removed, openings 170 and 171 are formed in root portion 160a. Similarly, openings 174 and 175 are formed in root portion 160c. Fixture 44 may be used as a template for forming openings 170, 171 and 174, 175. After being formed, openings 170, 171, 174 and 175 are threaded. Fixture 44 is placed on first stage compressor rotor wheel 16 with mounting members 79 and 80 aligning with openings 170 and 171 and mounting members 81 and 82 aligning with openings 174 and 175 as seen in FIG. 6. In addition to aligning mounting members 79, 80 and 81, 82 with openings 170, 171 and 174, 175, alignment members 137 and 138 abut an axial surface of first stage compressor rotor wheel 16. Mechanical fasteners (not separately labeled) are passed through openings 170, 171 and 174, 175 into mounting members 79, 80 and 81, 82 respectively. After mounting fixture 44, milling machine 48 is connected to guide section 74 through milling machine guide member 116 (FIG. 2).

Figure 7:
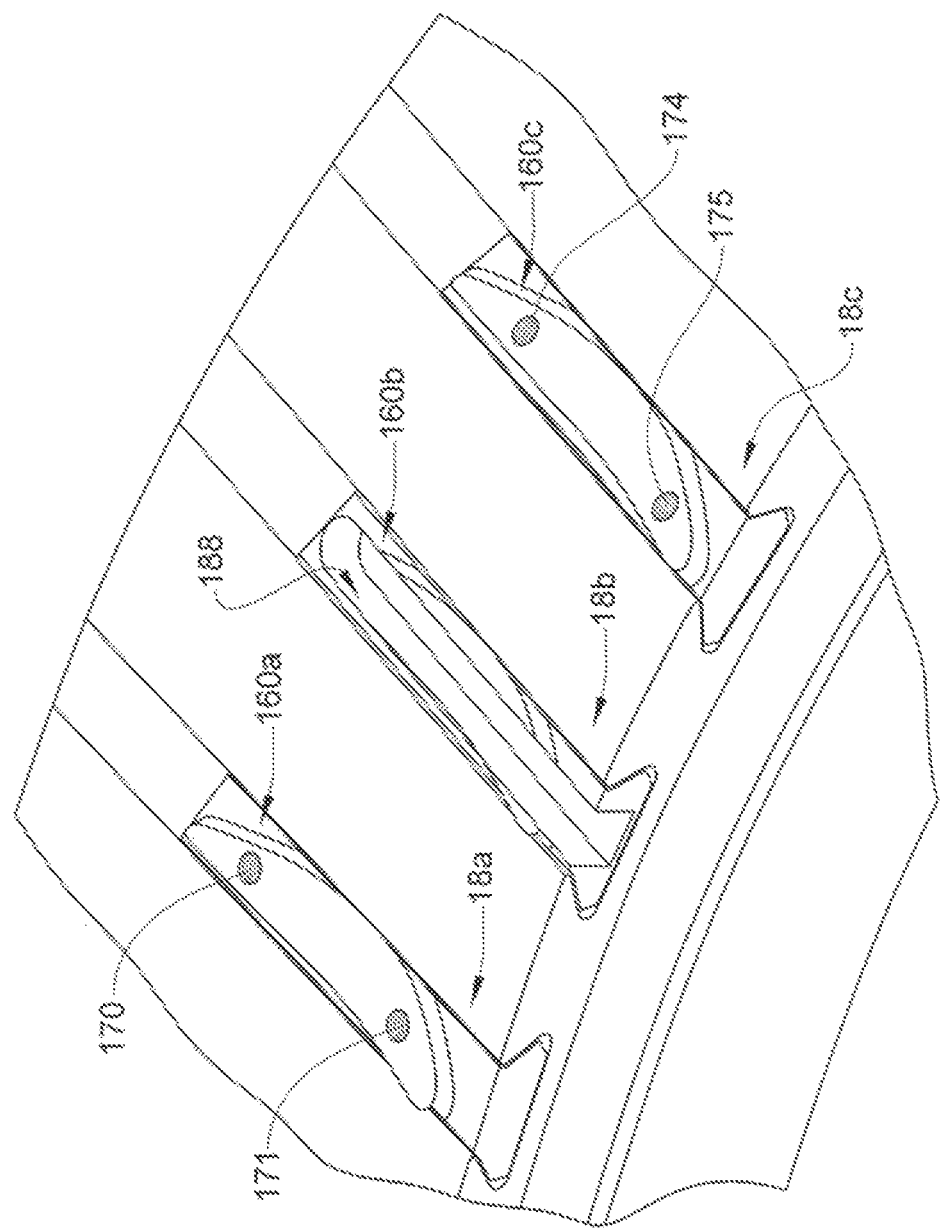
FIG. 7 is a detail view of the rotor wheel of FIG. 6 after cutting an axial slot into a dovetail portion of a rotor blade.
Figure 8:
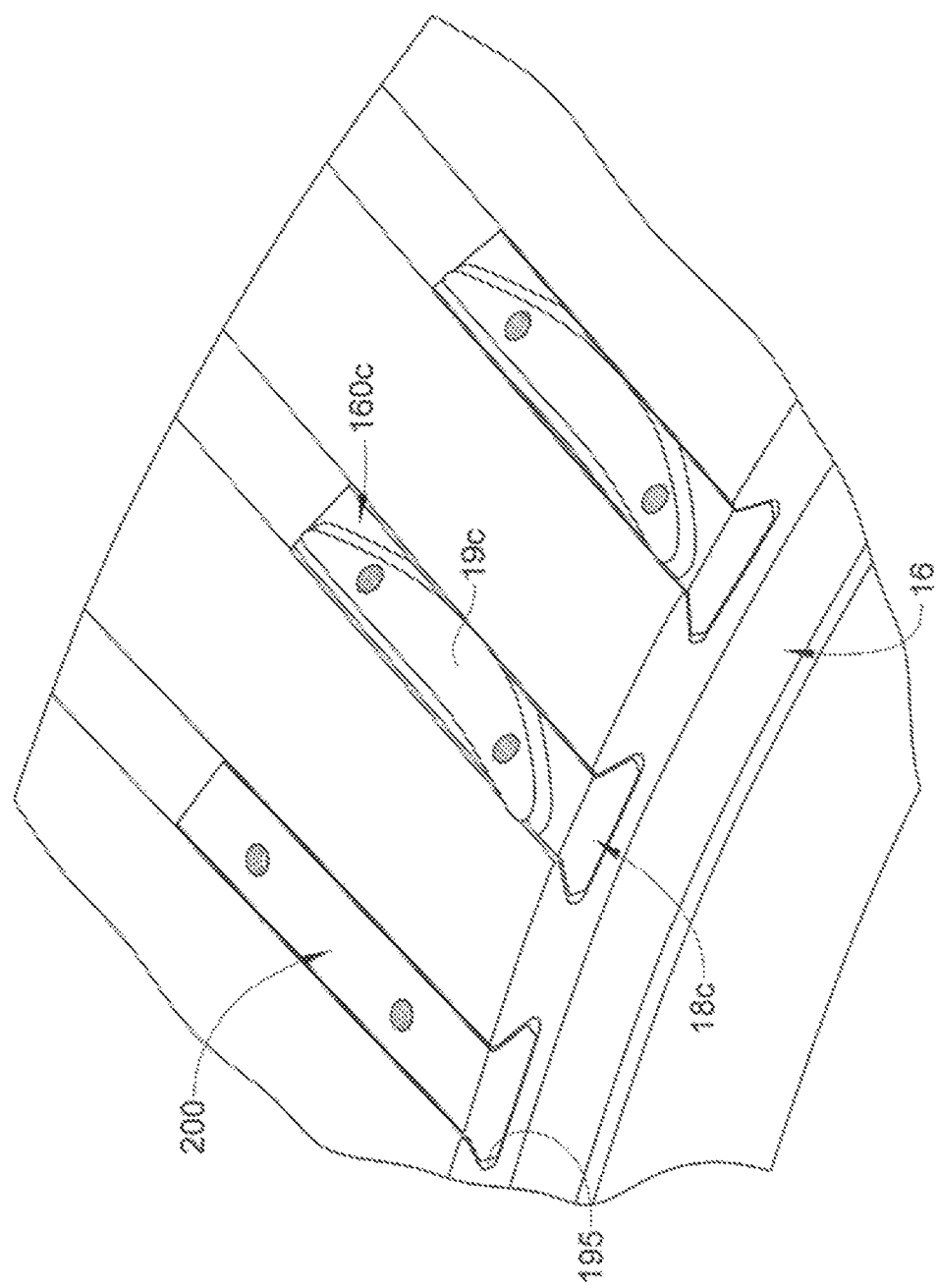
FIG. 8 is a detail view of the rotor wheel of FIG. 7 illustrating a dummy dovetail member mounted in a dovetail slot after removal of the rotor blade.

Milling machine 48 is activated and shifted axially across first stage compressor rotor wheel 16 causing cutter 147 to form an axial slot 188 through a dovetail portion 190 of rotor blade 18b, as shown in FIG. 7. After forming axial slot 188, fixture 44 is unfastened and any remaining portion of rotor blade 18b is removed from first stage compressor rotor wheel 16 leaving behind a dovetail slot 195. At this point, a dummy dovetail member 200 having threaded openings 204 and 205 is inserted into open dovetail slot 195 as shown in FIG. 8 and fixture 44 is reconnected to first stage compressor rotor wheel 16 to facilitate the removal of any remaining portion of first stage compressor rotor blade 18c.

At this point it should be understood that the turbomachine rotor blade milling system in accordance with the exemplary embodiments facilitates an in-field removal of frozen, e.g., locked into position, rotor blades. Instead of removing and shipping a rotor wheel to a repair facility, which can cost upwards of a million dollars or more, the rotor wheel may now be repaired in place. It should also be understood that while described in terms of removing frozen rotor blades from a first stage of a compressor, the exemplary embodiment may be employed to remove rotor blades from rotor wheels positioned at any stage of a turbomachine compressor portion. Moreover, the exemplary embodiments may be employed to remove rotor blades from rotor wheels arranged in a turbomachine turbine portion. Further, while described as being joined to the rotor wheel through mechanical fasteners, other structure, such as magnets may also be employed. Magnets may also be employed to join the milling machine guide member to the fixture. In addition, while described as being employed to achieve in-field removal of frozen blades, the exemplary embodiments may also be employed out of the field in a repair shop for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbomachine, comprising:
    a compressor portion comprising:
        a compressor rotor wheel defining a plurality of slots; and
        a plurality of compressor rotor blades, each compressor rotor blade comprising a root section received by one of the plurality of slots of the compressor rotor wheel;
    a combustor assembly;
    a turbine portion comprising:
        a turbine rotor wheel defining a plurality of slots; and
        a plurality of turbine rotor blades, each turbine rotor blade comprising a root section received by one of the plurality of slots of the turbine rotor wheel; and
    a machining system comprising a fixture mounted to the root section of one of the compressor rotor blades or the root section of one of the turbine rotor blades.

2. The turbomachine of claim 1, wherein the fixture mounts to the root sections of two of the plurality of compressor rotor blades or to the root sections of two of the plurality of turbine rotor blades.

3. The turbomachine of claim 1, further comprising:
    a dummy dovetail section positioned in one of the plurality of slots in the compressor rotor wheel or in one of the plurality of slots in the turbine rotor wheel, wherein the fixture mounts to the dummy dovetail section.

4. The turbomachine of claim 1, wherein the fixture mounts to the root section of one of the plurality of compressor rotor blades.

5. The turbomachine of claim 1, wherein the fixture mounts to the root section of one of the plurality of turbine rotor blades.

6. The turbomachine of claim 1, wherein the compressor rotor wheel defines a plurality of dovetail slots.

7. The turbomachine of claim 1, wherein the turbine rotor wheel defines a plurality of dovetail slots.

8. The turbomachine of claim 1, wherein the root portion of one of the plurality of compressor rotor blades or the root portion of one of the plurality of turbine rotor blades define a plurality of openings.

9. The turbomachine of claim 8, wherein the fixture defines a plurality of openings, and wherein each of the plurality of openings defined by the fixture are axially and circumferentially aligned with one of the plurality of openings defined by the root portion of one of the plurality of compressor rotor blades or the root portion of one of the plurality of turbine rotor blades.

10. The turbomachine of claim 1, wherein the machining system comprises a milling machine, the milling machine comprising a cutter for forming an opening in the root portion of one of the plurality of compressor rotor blades or the root portion of one of the plurality of turbine rotor blades.

11. The turbomachine of claim 10, wherein the machining system comprises a mounting system for coupling the milling machine to the fixture.

* * * * *